Patented Sept. 27, 1938

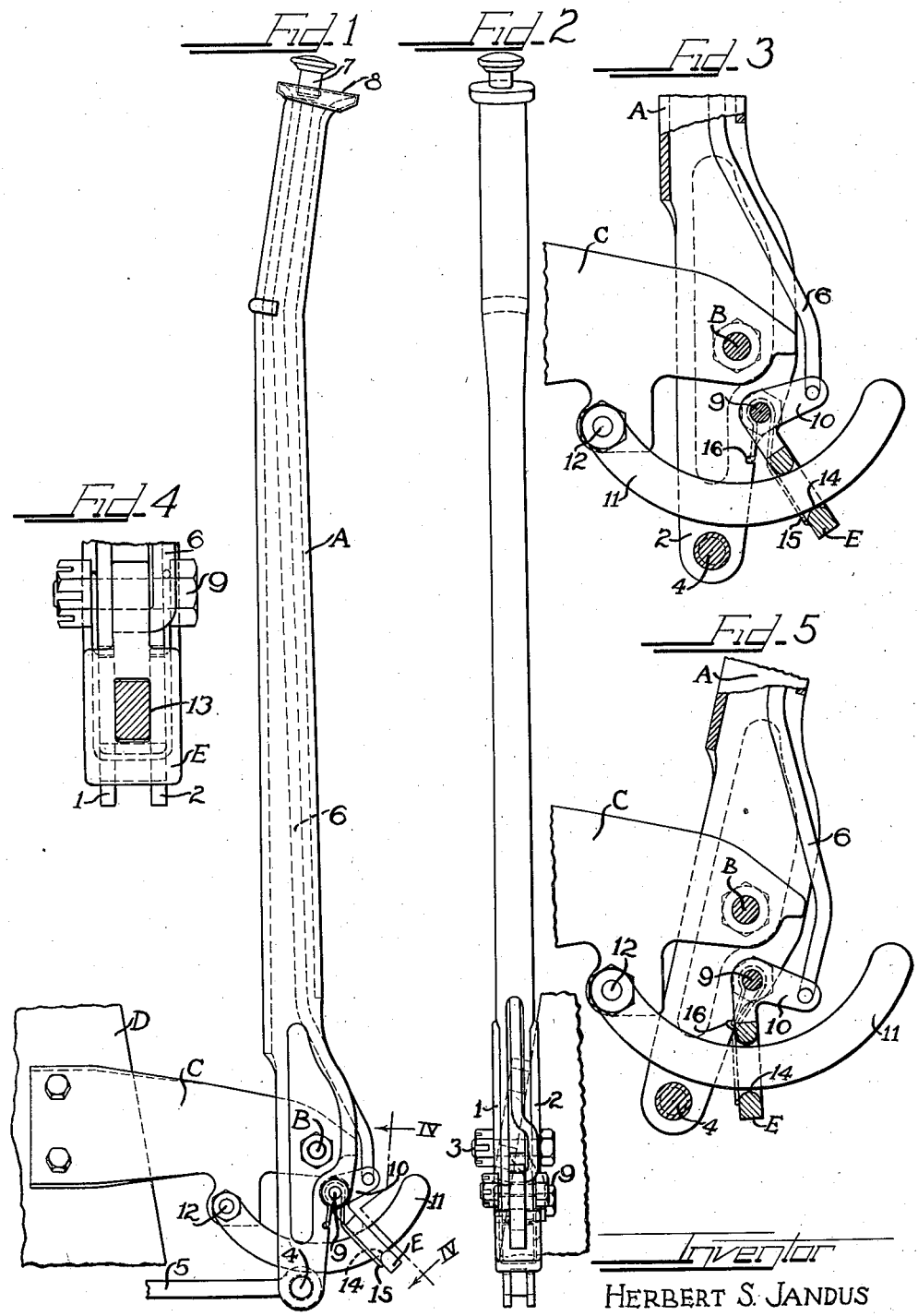

2,131,285

UNITED STATES PATENT OFFICE 2,131,285

BRAKE LEVER CONSTRUCTION

Herbert S. Jandus, Detroit, Mich., assignor to Oakes Products Corporation, North Chicago, Ill., a corporation of Michigan Application October 14, 1936, Serial No. 105,458

2 Claims. (Cl. 74—531)

The present invention relates to a brake lever construction, and more particularly to a brake lever construction for automotive vehicles.

An object of the present invention is to provide a brake lever construction wherein the lever is held in braking position by jamb action.

Another object of the present invention is to provide a brake lever construction wherein the usual pawl and ratchet latching means are eliminated, and the lever is held in braking position by clamp action.

A further object of the present invention is to provide an improved lock for brake levers of automotive vehicles in which the usual pawl and ratchet mechanism is eliminated.

A still further object of the present invention is to provide a brake lever construction with means whereby the lever may be held in any position of movement without the use of a ratchet.

Another and still further object of the present invention is to simplify brake lever construction to reduce the cost of manufacture without impairment of function and efficiency.

Generally speaking, the present invention contemplates a brake lever pivoted to swing in the usual manner and a cooperating segment or quadrant bar together with means on the lever for engaging the segment or quadrant bar with biting action to hold the lever in any desired position.

The above, other and further objects of the present invention will be apparent from the following description and accompanying drawing.

The accompanying drawing illustrates an embodiment of the present invention and the views thereof are as follows:

Figure 1 is a side elevational view of a brake lever construction embodying principles of the present invention.

Figure 2 is a front elevational view of the brake lever construction of Figure 1.

Figure 3 is an enlarged, fragmental view, partially in elevation and partially in section, of the lower construction of the arrangement of Figures 1 and 2.

Figure 4 is an enlarged sectional view taken substantially in the plane indicated by the line IV—IV of Figure 1.

Figure 5 is a view similar to Figure 3 showing the lever in released position.

The drawing will now be explained.

The form of the invention illustrated in Figures 1 to 5, inclusive, includes a conventional form of hollow brake lever A pivoted at B to a bracket C, which bracket is secured in any desired manner to a convenient part of the vehicle mechanism, such, for instance, as the transmission casing designated generally at D.

The lower end of the lever A is fashioned to provide parallel legs 1 and 2 which are suitably apertured to receive the pivot bolt B. The lower ends of the legs carry a pin 4 to which the brake rod 5 is connected.

Within the brake lever A is a pawl rod 6 having at its upper end a button 7 which projects through the end closure 8 of the upper end of the lever. Pivoted to the lower end of the lever, below the pivot B, as by a pivot bolt 9, is an oscillatable yoke E having an arm 10 as an integral part thereof and to which the lower end of the pawl rod 6 is connected. The body of the yoke E is centrally apertured to straddle a segment or quadrant bar 11 which is pivoted at one end thereof, as by a bolt 12, to a portion of the bracket C. The segment or quadrant bar is arranged with its convexity facing the end of the lever. The other end of the segment or quadrant bar 11 is unsecured, and the connection of the bar to its bracket C is such that the bar may swing about its pivot 12, as the lever A is swung back and forth in use.

The aperture 13 in the yoke E is in width sufficient to engage against the sides of the segment or quadrant bar 11, while the upper and lower margins of the aperture are rounded as at 14 (Figure 1) to form biting edges for firmly gripping the top and bottom margins of the segment or quadrant bar 11, to hold the lever in desired position. In order to cant the yoke E, a spring 15 is utilized. The spring 15 is bent about the pivot bolt 9 and has one end held in notches 16 formed in the legs 1 and 2 of the lever A. The spring bears against the face of the yoke E which is nearer the legs of the lever and its tendency is to rock the yoke E away from the legs of the lever. The spring further functions to maintain the pawl rod 6 in its uppermost position, that is, with the button 7 projected through the cap 8 of the lever at its upper end.

Due to the tension imposed on the brake rod 5 by the pull of the brakes, with the pressure against the thumb button released, there will be a tendency to rock the lower end of the lever to the left, as viewed in Figure 1. This will tend to move the pivot 9 of the yoke E to the left, whereupon the spring 15 tends to swing the yoke E to the right, thereby causing clamping of the yoke E against the segment or quadrant bar 11 to efficiently lock the lever in set position. When it is desired to release the lever from its set or locked position, the thumb button is depressed, whereupon the yoke E is swung to the left, as viewed in Figures 1, 3 and 5, to the position of Figure 5, out of biting engagement with the segment or quadrant bar 11, thereby permitting movement of the lever from set position to released position.

It is to be understood that the operator, prior to depressing the button 7, will pull the upper end of the lever to the left, as viewed in Figures 1 and 3, to enable release of the yoke E from biting engagement with the segment or quadrant bar. The thumb button 7 is continued in its depressed position by the thumb of the operator until the lever reaches its fully released position, whereupon thumb pressure is removed from the button, and the spring 15 then functions to bring the yoke into biting engagement with its segment or quadrant bar 11, thus locking the lever in released position.

It will be observed that the present invention provides brake lever construction which may be economically manufactured and which at the same time is efficiently constructed to secure positive locking action of a lever with its segment or quadrant bar in any position to which the lever may be moved. Furthermore, the construction of the present invention is such that it is very easy to release the brake lever from holding engagement, as but very slight movement of the pawl rod is necessary to tilt the yoke from biting engagement with its segment or quadrant bar after a slight pull has been applied to the end of the brake lever.

In the action of the quadrant bar and locking yoke, there is cooperative action between them such that the freedom of each to swing about its own axis tends to make the biting action between them more positive. The two parts may be said to be self-adjusting.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. Brake lever construction including a fixed supporting plate, a lever member pivoted to said plate between the lever ends, said lever having a hand grip at one end and a brake connection at the other end, a floating sector bar pivoted at one end to the said supporting plate with its other end free, a member in the form of a bell crank pivoted at its angle to said lever with one leg astraddle said sector bar and having portions adapted to have biting engagement with upper and lower faces of said bar, a release rod connected to the other leg of said crank, and a spring acting against the first mentioned leg of said crank to normally maintain said leg in biting engagement with said bar, the convexity of said sector bar being arranged facing the lower end of said lever.

2. A brake lever construction including a supporting plate, a brake lever pivoted to said plate near the lower end of said lever, said lever having a brake connection at its lower end, a floating sector bar pivoted at one end to said supporting plate and below the pivoted connection of said lever with said plate, the other end of said sector lever being free, a bell-crank pivoted at its angle to said lever and below the pivoted connection of said lever and said plate, said crank having one leg disposed straddling said sector bar and having its other leg pivotally connected to a depressible operating rod mounted on said lever, said one leg of said crank being provided with spaced opposed surfaces adapted to bitingly engage upper and lower surfaces of said sector rod, and spring means operative to elevate said operating rod and to tilt said crank into biting engagement with said sector bar.

HERBERT S. JANDUS.